March 30, 1954     H. LANGE     2,673,628
BRAKE FOR HOISTS, ELEVATORS, OR THE LIKE, AND BRAKE ACTUATOR
Filed Dec. 8, 1950     2 Sheets-Sheet 1

INVENTOR
Heinrich Lange
BY
ATTORNEY

March 30, 1954  H. LANGE  2,673,628
BRAKE FOR HOISTS, ELEVATORS, OR THE LIKE, AND BRAKE ACTUATOR
Filed Dec. 8, 1950  2 Sheets-Sheet 2
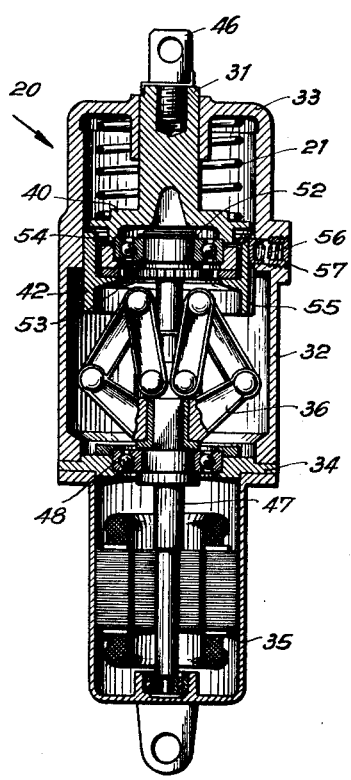
INVENTOR
Heinrich Lange
BY
ATTORNEY

UNITED STATES PATENT OFFICE 2,673,628

BRAKE FOR HOISTS, ELEVATORS, OR THE LIKE, AND BRAKE ACTUATOR

Heinrich Lange, Hamburg, Germany

Application December 8, 1950, Serial No. 199,743

Claims priority, application Germany December 19, 1949

15 Claims. (Cl. 188—171)

The present invention relates to a brake for hoists, elevators, or the like, i. e. to a brake which is normally under the action of a spring maintained in engaged condition but is adapted to be released by energization of a brake actuator or brake lifter driven by an electric motor. Moreover my invention relates to an actuating device for the engagement or disengagement of brakes, clutches, or the like.

Brakes of the kind to which the present invention relates will render the most satisfactory service if the applying force produced by the spring is properly proportioned to the force produced by the motor-driven brake lifter. In constructing brakes, however, it happens often that the designer disregards that requirement. Motor-driven actuating devices for the disengagement of brakes, clutches, and the like, ordinarily referred to as "brake lifters," are standard products available on the market in various sizes, whereas in many cases the brakes proper are custom-built, as the necessity for their use arises. The designer when designing such a brake is liable to elect a brake lifter of a larger size and a greater power than necessary for the performance of the particular brake under consideration, in order to avoid any risk that might be involved in the election of a brake lifter that is too small. As a result, however, the over-sized motor-driven brake lifter, when energized, will develop a stronger force than required for disengaging the brake and the surplus lifting force will result in a shock-like action. When the over-sized brake lifter is de-energized the applying force of the brake ordinarily produced by a weight or by a spring will be insufficient to promptly cause the brake to be re-engaged and the brake lifter to be restored to normal at a satisfactory speed.

It is an object of the present invention to provide means which will make it easier to the designer to properly proportion the power of the brake lifter to the brake applying force.

According to the present invention this object is attained by combining a spring producing the brake-applying force with an electric motor-driven brake lifter in a common casing. In order to permit of proper adjustment of the brake-applying force to meet the specific requirements of any particular case, according to the present invention the brake linkage is provided with means for varying the ratio of transmission at which the actuator comprising the brake-applying spring and the brake lifter acts on the brake shoes. The novel actuator in which the brake-applying spring and the brake-lifting means are included in a common casing is a standard product which is available in various sizes to the designer of any particular brake.

In a preferred embodiment of such actuating device according to the present invention the applying spring mounted within the casing tends to displace a thrust rod slidably guided in one end wall of the casing in an inward direction, while the electric motor mounted at the opposite end of said casing if energized tends through the intermediary of a known mechanism to press said thrust rod in an outward direction contrary to the tendency of the spring.

In the present invention the brake-applying spring is preferably formed by a helical spring interposed between one end wall of the casing and a plate attached to the thrust rod.

The present invention lends itself particularly to its application to brake lifters of the type having a centrifugal fly-weight mechanism driven by an electric motor and adapted when accelerated to axially displace the thrust rod. A brake lifter of that type is disclosed in my prior patent application, Serial No. 120,874, filed October 12, 1949, now Patent No. 2,579,266, granted December 18, 1951.

In cases where such actuating devices are applied to hoists, elevators, or the like in which the brake must be immediately, without any substantial delay, applied as soon as the electric motor of the brake lifter is de-energized, an auxiliary brake must be provided which will decelerate the rotating centrifugal link mechanism and quickly stop the same when the electric current energizing the brake lifter has been cut off.

It is another object of the present invention to provide a novel actuating device for the operation of brakes, clutches, or the like, such actuating device being provided with an improved auxiliary brake that is simple in design and reliable in its operation.

It is a more specific object of the present invention to so design the auxiliary brake of the brake actuator as to permit of easy adjustment from the outside while the actuating device is in operation thus enabling the operator to directly observe the effect of any adjustment of the auxiliary brake.

In a known actuating device of the type including a centrifugal link mechanism driven by an electric motor and equipped with an auxiliary brake, the de-energizing interval, i. e. the interval between the instant at which the electric current is cut off and the instant at which the centrifugal link mechanism comes to a stop, may be varied by a variation of the bias of a spring acting on the auxiliary brake. The lifting of the auxiliary brake is accomplished co-incidentally to the starting of the electric motor by rotation of the motor shaft relative to the centrifugal link mechanism, such relative rotation permitted by a lost-motion connection being operative through a cam to disengage the auxiliary brake. Such prior actuating device involves a number of disadvantages. In order to permit the operator to re-adjust the spring acting on the auxiliary brake, large holes must be provided in the casing, such holes weakening the casing and being apt to result in leakage which is a material disadvantage where the actuating device is installed outdoors. Even with large holes in the casing, the adjustment of the spring is complicated since first a nut inside of the casing must be loosened and, after the re-adjustment, tightened again. Furthermore, such adjustment cannot be performed while the device is in operation. The cam is liable to give rise to trouble since an insufficient inclination of the cam must be compensated for by a relatively large circumferential dimension of the cam and a corresponding angle of relative rotation between the electric motor and the centrifugal link mechanism. As a result, the motor shaft having rotated through such angle will act on the centrifugal link mechanism with a shock. A reduction of such shock by a corresponding reduction of the relative angle of rotation of the electric motor and the centrifugal link mechanism, however, requires that the cam be given a large inclination. In that event, however, the auxiliary brake disk, once the full rotary speed has been attained and the driving torque has decreased accordingly, is liable to be turned backwards under the effect of the spring acting on the cam, thus permitting the brake disk to slip.

It is a further object of the present invention to avoid such disadvantages. According to the present invention the auxiliary brake is engaged and disengaged by the axial displacement produced by the centrifugal link mechanism. While this arrangement requires that the actuating device be started from its full-stop condition with the auxiliary brake in engaged position until accelerated to a speed resulting in an axial displacement of the centrifugal link mechanism and in a consequent disengagement of the auxiliary brake, experience has shown that the temporary additional load imposed on the electric motor by the auxiliary brake is immaterial. The normal starting torque produced by the electric motor is amply sufficient to overcome the resistance of the auxiliary brake. Immediately after the actuating device has been started the auxiliary brake will be released. Since in the actuating device of the present invention the electric motor is rigidly connected with the centrifugal link mechanism, no rotary lost-motion being provided therebetween, no shocks whatsoever occur incidentally to the starting of the motor, thus avoiding a material disadvantage of the prior art actuating device equipped with an auxiliary brake.

According to another feature of the present invention a friction shoe produces an adjustable force upon an axially movable brake element adapted to exert the engaging power on the auxiliary brake, such force determining the load of the auxiliary brake which load controls the de-energizing interval. Hence, the de-energizing interval of the novel actuating device may be readily controlled by suitable adjustment of the frictional force produced by the friction shoe.

In a preferred embodiment of the present invention a rotary brake disk participating in the rotation and in the axial displacement of the centrifugal link mechanism is operative upon a deceleration of the centrifugal link mechanism to engage the flange of a sleeve which is connected with the actuating rod for common axial displacement with a certain lost-motion, the displacement of such sleeve being restrained by the friction shoe. Such arrangement results in a simple mechanism and in a reliable operation thereof. The friction shoe may be readily so arranged as to be capable of adjustment from the outside thus enabling the operator to vary the de-energizing interval by a simple manipulation thus providing for a possibility of adapting the actuating device to the requirements of any particular case.

A particularly simple and inexpensive construction of the actuating device may be attained by providing the friction shoe for the dual purpose of controlling the load on the auxiliary brake and for securing the sleeve against relative rotary displacement in the casing.

A preferred embodiment of the present invention is illustrated in the accompanying drawings while the features of novelty are pointed out in the claims.

In the drawings:

Fig. 3 is a longitudinal section through the brake actuator illustrated in Fig. 1, such actuator being shown in de-energized condition;

Fig. 4 is a longitudinal section through the actuator similar to that illustrated in Fig. 3 with the parts assuming the positions corresponding to the energized condition of the actuator.

Figure 1:
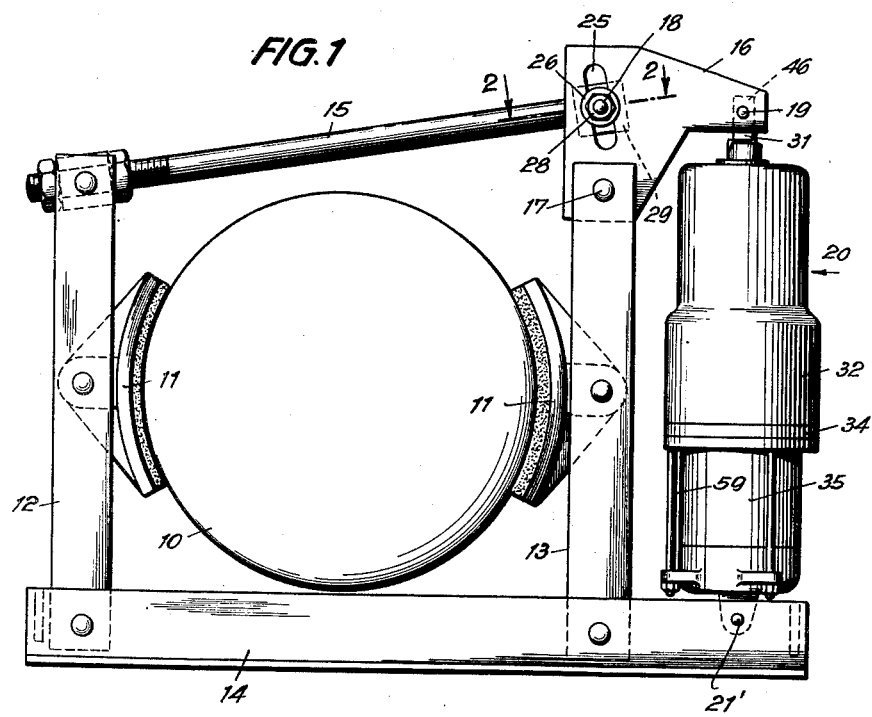
Fig. 1 is an elevation of a brake for a lifting drum of a hoist or elevator provided with the novel actuator.

Brake shoes 11 adapted to engage a brake drum 10 are carried by levers 12, 13 intermediate their ends which are pivotally mounted on a base plate 14, the upper ends of such levers being connected to a brake linkage. Such linkage comprises a connecting link 15 hinged to the upper end of lever 12 and to a bell crank 16. In the manner described hereinafter the bell crank is provided with a pivot pin 18 on which the rod 15 is pivoted, while a depending arm of the bell crank 16 is pivotally connected with the upper end of the lever 13 by a pin 17, the horizontal arm of the bell crank 16 being connected by a pin 19 with the brake actuator designated by 20 as a whole.

The casing of the brake actuator is pivotally connected with the base plate 14 by a pin 21'. When the brake actuator is energized, it will rock the bell crank 16 in anti-clockwise direction whereby the two levers 12, 13 are moved apart thereby lifting the brake shoes 11 from the brake drum 10.

In Fig. 1 the actuator 20 is shown in de-energized condition in which a load spring 21 (Fig. 3) incorporated in the actuator 20 tends to reduce the distance of the pins 19, 21' thereby tending to rock the bell crank 16 in clockwise direction and to tilt the levers 12, 13 towards one another pressing the brake shoes 11 upon the drum 10 thus engaging the brake.

Figure 2:
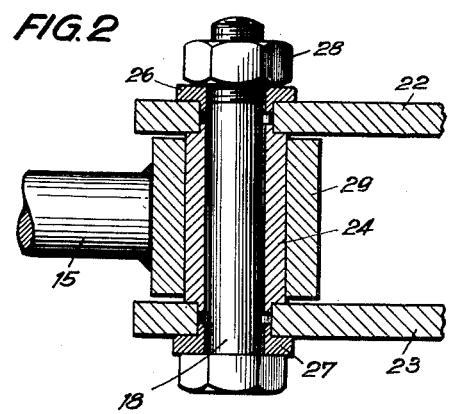
Fig. 2 shows the partial section taken along line 2—2 of Fig. 1 on an enlarged scale.

For the purpose of rendering adjustable the load exerted by spring 21 upon the brake shoes 11, the distance of the pins 17, 18 is variable. To this end the arrangement illustrated in Fig. 2 is provided. The bell crank 16 consists of two end plates 22, 23 which are spaced from one another by an interposed sleeve 24 having recessed ends engaging curved slots 25 provided in the end plates 22, 23. The pin 18 extends through the sleeve 24. Washers 26, 27 are inserted between the end plates 22, 23 and a head of pin 18, and a nut 28 on the threaded end of such pin, respectively.

Normally the nut 28 is tightened thus rigidly securing the end plates 22, 23, the sleeve 24, and the pin 18 to each other to constitute a rigid structure. When the nut 28 is released, however, the sleeve 24 may be displaced in the slot 25 to vary the distance of the pins 17, 18. Upon such adjustment, the nut 28 will be tightened again to keep the parts in the re-adjusted position. An eye 29 is rigidly attached to the rod 15 such eye being journaled on the sleeve 24.

By suitably electing the distance of the pins 17, 18 which distance may be varied within wide limits the operator may determine the ratio of transmission at which the actuator 20 including the load spring 21 acts on the brake shoes 11.

Owing to this novel arrangement a standard actuator 20 of a suitable size may be installed in custom-built brakes of different sizes and the ratio of transmission may be so adjusted in any particular case as to properly determine the engaging force or load of the brake. In this manner the risk of a faulty proportion between such load and the size of the actuator is eliminated. Also the designer is saved the trouble of exactly determining the required brake load in advance, since he may arrive at the desired load by proper adjustment of the ratio of transmission of the brake linkage 12, 13, 15, 16. Thus it will be appreciated that the braking power is no longer varied by adjustment of the load spring which would adversely effect its proper proportioning to the lifting device. In this manner an insufficient utilization of the lifting power of the brake lifting device is precluded at the outset.

In Figs. 3 and 4 a preferred embodiment of the novel actuator is shown in section. The actuator comprises a substantially cylindrical casing 32 having an upper end wall 33 provided with a central opening and a lower removable end wall 34 likewise provided with a central opening. An A. C. three-phase current motor 11 operating at 3,000 R. P. M. is mounted on the end wall 34 and bolted to the casing 32 by a number of bolts 59 (Fig. 1).

In the opening provided in the upper end wall 33 the actuating rod 31 is slidably guided which is provided with a threaded bore for the attachment thereto of an eye 46 adapted to accommodate the pivot pin 19. The electric motor 35 drives a shaft 47 which is provided with a square head and is journaled by means of a ball bearing 48 in the central opening provided in end wall 34. A star shaped member having a plurality of radial arms 36 is firmly mounted on the square head of shaft 47 for common rotation therewith.

A member provided between and in axial alignment with the actuating rod 31 and the shaft 47 and constituted in the present embodiment by another shaft 39 and a head 51 integral therewith is connected with each of the arms 36 by a pair of centrifugal links 37 and 38 hinged to one another and to the respective arm 36 and to a block 49 integral with the shaft 39. The upper end of the latter is rotatably and nonslidably connected with the actuating rod 31 by means of a ball bearing 50, the inner race of the latter being seated on the head 51 and attached thereto by a split ring 52 while the outer race is seated in the recessed rim of a circular plate 40 integral with the actuating rod 31 being held in place by a flanged ring 45 which engages over the outer race of ball bearing 50 and is bolted to the plate 40 by a number of bolts (not shown). In this manner, the rotary member 39, 51 connected for common rotation with the centrifugal link mechanism 36, 37, 38 is combined with the thrust rod 31 for common axial displacement therewith. The lower end of the shaft 39 is slidably guided in an axial bore of the shaft 47.

In the present embodiment of the novel actuator, a helical spring 21 is mounted in the casing 32 for action on the actuating rod 31 tending to move the same inwardly into the position shown in Fig. 3 thus imposing on the brake shoes 11 the load required to engage the brake 10, 11. To this end, the spring 21 surrounds the rod 31 and bears against the end plate 33 and the circular plate 40.

The parts assume the position shown in Fig. 3 when the electric motor 35 is at rest. When the electric motor is started, the links 37 and 38 acting as fly-weights are hurled by the centrifugal force from the resting position shown in Fig. 3 into the operated outer position shown in Fig. 4 whereby the member 39 is lifted pushing the actuating rod 31 in a direction out of casing 32 to thereby lift the brake shoes 11. In this manner the electric motor 35 will produce the actuating impulse.

When the brake shoes 11 are to be engaged with the brake drum 10, the electric motor 35 is de-energized. In order to slow down and stop the rotary motion of the centrifugal link mechanism 36, 37 and 38, a novel auxiliary brake is co-ordinated thereto which will now be described.

A rotary brake disc 41 preferably made of a non-metallic material of suitable properties such as fibre is suitably attached to the member 51, 39. In the embodiment shown the head 51 is integral with a toothed rim 53 engaging internal teeth of the annular brake disc 41 whereby the latter is connected for common rotation with the member 51, 39. A flanged sleeve 42 having an internal flange 43 underlying the brake disk 41 is slidably mounted in the upper part of casing 32 and lost motion means are provided to connect the sleeve 42 with the rod 31 for common axial displacement. For this purpose, the sleeve 42 has an inner circumferential groove near its upper end accommodating a split ring 54 which overlies the ring 45 which, as will be recalled, is rigidly bolted to the plate 40 integral with the rod 31. The split ring 54 is spaced from the flange 43 a distance slightly in excess of the aggregate height of both, the brake disk 41 and the ring 45.

The sleeve 42 has an outer longitudinal groove 55 which is engaged by a substantially cylindrical brake shoe 44 slidably guided in a radial bore provided in the wall of the casing 32 and adapted to be urged inwardly by a helical spring 56 which is inserted in such bore and adapted to be biased by a cap 57 closing the bore and engaging internal threads thereof. The cap 57 is provided with a diametrical outer slot for insertion of a screw driver. Thus, the cap 57 may be turned for adjustment of the bias of spring 56.

The operation of the novel auxiliary brake constituted by rotary brake disc 41 and the non-rotary brake element 42, 43 is as follows:

When the parts assume the resting position shown in Fig. 3, the brake disk 41 is firmly embraced by the flange 43 and the ring 45, whereas the split ring 54 is slightly spaced from the top of ring 45. When the motor 35 is energized, it will impart rotation to the centrifugal link mechanism 36, 37, 38 and to the member 39, 51. The brake disk 41 participates in such rotation. Therefore, the electric motor 35 must overcome the friction effective between the brake disk 41 on the one hand and the flange 43 and the ring 45 on the other hand, the flange being held against rotation by engagement of the brake shoe 44 with the groove 55 of the sleeve 42. As the rotary elements gather speed, the member 39 will be pushed upwards contrary to the tendency of the spring 21, as described herein above. When such upward motion of the member 39, 51 commences, the ring 45 will be lifted and will take up the lost motion between itself and the split ring 54 at the same time releasing the grip with which the friction disk 41 is being held between the ring 45 and the flange 43. Thus the auxiliary brake will be disengaged immediately after the commencement of the outward motion of the rod 31 and will be maintained in disengaged condition as long as the motor 35 is energized.

On further acceleration of motor 35, the actuating rod 31 is raised into the position of Fig. 4 dragging the sleeve 42 along upwardly.

When the current energizing motor 35 is cut off, the friction in the bearings 48 and 50 and the resistance offered by the air to the rotary motion of the links 37 and 38 and of the star shape member 36 even though small will immediately decelerate the link mechanism sufficiently to permit spring 21 to slightly depress the actuating rod 31 and the ring 45 rigidly bolted thereto. As a result, the ring 45 will bear upon the brake disk 41 pressing the same against the flange 43 thus producing an additional braking force quickly decelerating the rotary elements.

The braking force, however, is limited by the fact that the sleeve 42 with the flange 43 may yield to the pressure exerted by the brake disk 41 upon it and may slide downwardly. The force with which the brake disk 41 is gripped between the flange 43 and the ring 45 is thus determined by the friction of the brake shoe 44 which must be overcome on downward motion of sleeve 42. Therefore, it will be appreciated that the braking couple produced by the auxiliary brake 41, 43, 45 may be varied by suitable adjustment of the pressure exerted by the brake shoe 44 upon the sleeve 42. Such adjustment may be effected by the setting of cap 57. The stronger the spring 56 is biased, the higher will be such braking couple and the shorter will be the consequent de-energizing interval between the instant at which the current is cut off and the instant at which the rod 31 reaches the resting position shown in Fig. 3.

Since the shaft of motor 35 is rigidly connected with the star shaped carrier 36 of the centrifugal link mechanism no shocks will be produced incidentally to the starting thereof. While the parts after arriving in the resting position of Fig. 3 will continue to hold the auxiliary brake 41, 43, 45 in its effective condition, the auxiliary brake will be disengaged in the initial phase of the operation of the actuator and will then be maintained in disengaged condition as long as the motor 35 is energized.

The arrangement illustrated in Figs. 1 and 2 offers material advantages over the prior art arrangement including one or more load springs mounted on the control linkage. In this prior art the designer must calculate the spring all over again for any particular application such calculation involving the risk of errors in the choice of the dimensions and of the materials, such errors affecting adversely the life of the springs and the reliability of the brake in operation. Also the springs are liable to jam or to get caught in the linkage. All such shortcomings inherent in the prior art structures are avoided by the present invention since the spring 21 is accommodated in the casing 32 in a sheltered condition, all parts of the actuator produced by well established mass production methods being subjected to a careful examination of the material and to endurance tests guaranteeing a maximum safety in operation. Hence the superiority of the use of load springs for engagement of the brake over the use of weights such superiority being based on the uniform elastic effect of the force and on the absence of inertia effects may be utilized without risking unreliability in operation.

While I have described the auxiliary brake as applied to an actuator incorporating a load spring 21 it is equally applicable to actuators without any such spring, for instance of the type disclosed in my said United States Patent No. 2,579,266.

While in the embodiment shown the actuating motion of rod 31 is preferably a motion in outward direction, the auxiliary brake is equally applicable to centrifugal actuating devices in which the actuating motion is not directed outwardly. Therefore, in some of the claims I have described the actuating motion of rod 31 as a "forward displacement" and the return motion as a "rearward displacement."

Moreover, it will be appreciated from the foregoing description with reference to Figs. 3 and 4 that the ring 45 constitutes a means which is adapted to be operated by the axial displacement of member 39, 51 and rod 31 and to release the auxiliary brake in response to the outward displacement and to apply the auxiliary brake in response to the inward displacement.

Also it will be noted that the motor 35 is free from any driving connection except that with the centrifugal link mechanism 36, 37, 38. By this token the present invention differs from centrifugal regulators where the motor serves as a prime mover to drive some machinery.

Since any friction clutch by its very nature is a brake capable by friction of controlling the relative rotation of its elements, the novel actuator described hereinabove is equally applicable to friction clutches which are normally kept in engaged condition by a spring but may be disengaged by a motor-driven actuator. The term "brake actuator" used in the claims is intended to include such use of the actuator.

While I have described my invention with reference to a preferred embodiment thereof, I wish it to be clearly understood that the same is capable of numerous modifications within the scope of the appended claims.

What I claim is:

1. Actuating device of the character described comprising a rotary electric motor, a rotary shaft adapted to be driven thereby, a slidable actuating rod mounted for forward and rearward displacement, a rotary member, means for rotatably and substantially non-slidably connecting said rod with said member, a rotary centrifugal link mechanism carried by said shaft and linked to said member and adapted when accelerated by said electric motor to impart a forward displacement to said member and said rod, an auxiliary brake co-ordinated to one of said rotary elements, and means adapted to be operated by said axial displacement and to release said auxiliary brake in response to said forward displacement and to apply said auxiliary brake in response to said rearward displacement.

2. Actuating device of the character described comprising a casing, a shaft journalled in one wall thereof, an actuating rod slidably mounted in the opposite wall thereof co-axial with said shaft, and adapted to be connected to the part which is to be actuated, a member aligned with said shaft means for rotatably and substantially non-slidably connecting said rod with said member, an electric motor mounted on said casing to drive said shaft, a centrifugal link mechanism carried by said shaft and linked to said member and adapted, when driven by said motor, to produce an axial force tending to thrust said rod in a direction out of said casing, an auxiliary brake co-ordinated to said rotary member, and means adapted to be operated by said rod and to control said auxiliary brake so as to release the same on outward motion of said rod and to apply the same on inward motion of said rod, said motor being free from any driving connection except that with said shaft.

3. Actuating device of the character described comprising a substantially cylindrical casing, an actuating rod slidably mounted in one end wall of said casing and adapted to be connected to the part which is to be actuated, an electric motor mounted at the other end of said casing, a centrifugal link mechanism enclosed within said casing and arranged between and co-operatively connected with said motor and said rod and adapted when driven by said motor to produce an axial force tending to thrust said rod in a direction out of said casing, an auxiliary brake co-ordinated to said centrifugal link mechanism and said electric motor to restrain the rotary motion of the same, and means adapted to be operated by said rod to control said auxiliary brake so as to release same on outward motion of said rod and to apply the same on inward motion of said rod, said motor being free from any driving connection except that with said centrifugal link mechanism.

4. Actuating device of the character described comprising an electric motor, a shaft adapted to be driven thereby, a slidable actuating rod, a rotary member, means for rotatably and substantially non-slidably connecting said rod with said member, a rotary centrifugal link mechanism carried by said shaft and linked to said member and adapted when accelerated by said electric motor to axially displace to said member and said rod, a rotary brake disk mounted on said rotary member, a non-rotary brake element mounted for axial displacement and co-operation with said disk, frictional means co-ordinated to said brake element and adapted to restrain axial displacement thereof, and lost-motion means connecting said brake element with said rod for common displacement.

5. Actuating device of the character described comprising a casing, an actuating rod slidably mounted in one end wall of said casing and adapted to be connected to the part which is to be actuated, an electric motor mounted at the other end of said casing, a centrifugal link mechanism enclosed within said casing and arranged between and co-operatively connected with said motor and said rod and adapted when driven by said motor to produce an axial force tending to thrust said rod in a direction out of said casing, a rotary brake disk mounted for common rotation with said centrifugal link mechanism and for common displacement with said rod, a non-rotary brake element slidably and non-rotatably mounted in said casing for co-operation with said disk, frictional means mounted in the wall of said casing for co-operation with said brake element and adapted to restrain the sliding motion thereof, lost-motion means connecting said brake element with said rod for common axial displacement in said casing, and adjustable means mounted in the wall of said casing to be accessible from the outside thereof and adapted to adjust the friction produced by said frictional means.

6. Actuating device of the character described comprising an electric motor, a shaft adapted to be driven thereby, a slidable actuating rod, a rotary member, means for rotatably and substantially non-slidably connecting said rod with said member, a rotary centrifugal link mechanism carried by said shaft and linked to said member and adapted when accelerated by said electric motor to axially displace said member and said rod, a rotary brake disk mounted on said rotary member, a non-rotary brake element mounted for axial displacement and co-operation with said disk, frictional means co-ordinated to said brake element and adapted to restrain axial displacement thereof, and lost-motion means connecting said brake element with said rod for common displacement, a rotary brake disk mounted on said rotary member, a flanged sleeve slidably mounted co-axially with respect to said disk, the flange of said sleeve being adapted to contact said disk, a frictional shoe mounted for engagement with said sleeve to restrain axial sliding motion thereof, and lost-motion means connecting said sleeve with said rod for common sliding motion thereof.

7. Actuating device of the character described comprising a substantially cylindrical casing having a lateral hole, an actuating rod slidably mounted in one end wall of said casing and adapted to be connected to the part which is to be actuated, an electric motor mounted on the other end of said casing, a shaft adapted to be driven by said electric motor, a rotary member, an anti-friction bearing connecting said rod with said member for common axial displacement, a rotary centrifugal link mechanism enclosed within said casing carried by said shaft and linked to said member and adapted when driven by said motor to produce an axial force tending to thrust said rod in a direction out of said casing, a rotary brake disk attached to said member, a flanged sleeve slidably mounted in said casing with its flange adjacent to and adapted to be contacted by said disk upon inward displacement of said member and said rod, said sleeve having a longitudinal groove, a frictional shoe mounted in said bore and engaging said groove, and a spring mounted to press said shoe against said sleeve, a threaded member co-ordinated to and adapted to adjust said spring, and lost-motion means connecting said sleeve with said rod for common outward displacement.

8. In a brake for hoisting devices and the like, the combination comprising a casing, an actuating rod slidably mounted in one end wall of said casing, a brake-shoe actuating linkage, means permanently connecting said linkage to said rod, a spring mounted in said casing for action on said rod and adapted to produce the full brake-applying force required, an electric motor mounted at the other end of said casing, means enclosed within said casing and arranged between and co-operatively connected with said motor and said rod and adapted when driven by said motor to produce an axial force tending to thrust said rod in a brake-lifting direction out of said casing contrary to the tendency of said spring, and an auxiliary brake co-ordinated to said motor-driven means and adapted to decelerate same when said motor is de-energized.

9. The combination set forth in claim 3 including a spring mounted in said casing for action on said rod tending to move same inwardly.

10. The combination set forth in claim 7 including a spring mounted in said casing for action on said rod tending to move same inwardly.

11. In a brake for hoisting devices and the like, the combination comprising a brake-actuating linkage and a brake actuator including an actuating member, means for permanently connecting said member to said linkage, a spring tending to move said member in a brake-applying direction and adapted to produce the full brake-applying force required, an electric motor, and means co-operatively connected with said motor and said actuating member and adapted when driven by said motor to move said actuating member in a brake-lifting direction contrary to the tendency of said spring, said linkage including an adjustable element adapted to vary the ratio of transmission between said actuator and the brake.

12. In a brake for hoisting devices and the like, the combination comprising a brake actuating linkage, a brake actuator including a thrust rod, a rotary centrifugal link mechanism co-operatively connected thereto and adapted when rotated to exert a thrust on said rod, an electric motor adapted to drive said centrifugal link mechanism, means for permanently connecting said thrust rod to said linkage, an auxiliary brake co-ordinated to said mechanism and adapted, upon de-energization of said motor, to stop the rotation of said centrifugal link mechanism, means adjustable from the outside of said actuator to adjust said auxiliary brake, a spring co-ordinated to and tending to move said thrust rod in a brake-applying direction and adapted to produce the full brake-applying force required, and an adjustable element included in said linkage and adapted to vary the ratio of transmission of motion between said thrust rod and the brake.

13. In a brake for hoisting devices and the like, the combination comprising a brake actuating linkage, braking elements operable by said linkage, a brake actuator including a casing, a thrust rod slidable in and projecting from said casing, a rotary centrifugal link mechanism encased in said casing and co-operatively connected to said thrust rod and adapted when rotated to exert a thrust on said rod, an electric motor mounted on said casing and adapted to drive said centrifugal link mechanism, means for permanently connecting said thrust rod to said linkage, an auxiliary brake provided in said casing and co-ordinated to said mechanism and adapted, upon de-energization of said motor, to stop the rotation of said centrifugal link mechanism, means adjustable from the outside of said casing to adjust said auxiliary brake, a spring provided in said casing and co-ordinated to and tending to move said thrust rod in a brake-applying direction and adapted to produce the full brake-applying force required, and an adjustable element included in said linkage and adapted to vary the ratio of transmission of motion between said thrust rod and said braking elements.

14. In a brake for hoisting devices and the like, the combination comprising a casing, a linkage carrying the brake-shoe or the brake-shoes, said linkage being free from any brake-applying weight or spring, an actuating member slidable in said casing, means permanently connecting said linkage to said member, a spring mounted in said casing for action on said actuating member and adapted to move said member in one direction to produce the full brake-applying force required, an electric motor carried by said casing, and means enclosed within said casing and operatively connected with said motor and said actuating member and adapted when driven by said motor to exert a force on said member tending to move the same in a brake-lifting direction contrary to the tendency of said spring.

15. Actuating device of the character described comprising a casing have a hole, an actuating rod slidably mounted in said casing and adapted to be connected to the part which is to be actuated, rotatable means including an electric motor carried by said casing, and a mechanism enclosed within said casing and operatively connected both with said motor and said rod and adapted when driven by said motor to produce an axial force tending to thrust said rod out of said casing, an auxiliary brake co-ordinated to said rotatable means, and adjustable means mounted in said hole to be accessible from the outside of said casing and co-ordinated to said auxiliary brake to adjust the braking couple produced thereby.

HEINRICH LANGE.

References Cited in the file of this patent

UNITED STATES PATENTS

| Number | Name | Date |
|---|---|---|
| 790,042 | Estes | May 16, 1905 |
| 837,400 | Grosvenor | Dec. 4, 1906 |
| 2,127,335 | Hodgson | Aug 16, 1938 |
| 2,410,091 | Lynch | Oct. 29, 1946 |
| 2,579,266 | Lange | Dec. 18, 1951 |

FOREIGN PATENTS

| Number | Country | Date |
|---|---|---|
| 458,516 | Great Britain | Dec. 22, 1936 |